United States Patent Office 3,506,757
Patented Apr. 14, 1970

3,506,757
LIQUID DENTIFRICE CONTAINING POWDERED ABRASIVE
Gerhard Martin Salzmann, Franklin Lakes, N.J., assignor to Colgate-Palmolive Company, New York, N.Y., a corporation of Delaware
No Drawing. Filed Feb. 6, 1967, Ser. No. 614,033
Int. Cl. A61k 7/16
U.S. Cl. 424—52      8 Claims

ABSTRACT OF THE DISCLOSURE

This disclosure relates to a liquid dentifrice containing an abrasive ingredient in the form of a stable suspension by utilizing about 0.3–2.0% of a polysaccharide of high molecular weight, the molecule containing mannose, glucose, potassium glucuronate and acetyl in the approximate molar ratio of 2:1:1:1, as the stabilizing and suspending agent.

---

The present invention relates to a liquid dentifrice containing an abrasive material in the form of a stabilized suspension.

In the past, liquid dentifrices were proposed from which abrasives were omitted because of the difficulty of maintaining such solid particles in suspension upon prolonged storage. The use of known suspending and thickening agents such as Irish moss, and the like has not overcome the problem of preventing the abrasive from separating out of the composition.

It has now been found that a liquid dentifrice containing a stabilized suspension of an abrasive can be formulated by utilizing a polysaccharide having a molecular weight in excess of 1,000,000, said molecule containing mannose, glucose, potassium glucuronate and acetyl in the approximate ratio of 2:1:1:1, as the suspending and thickening agent.

More specifically, the precent invention relates to a liquid dentifrice comprising a stable suspension of an abrasive material in a liquid vehicle and about 0.3–2.0% and preferably 0.8–1.0% of a polysaccharide of high molecular weight, the molecule containing mannose, glucose, potassium glucuronate and acetyl in the approximate molar ratio of 2:1:1:1. The amount of polysaccharide may be varied within aforesaid relatively narrow limits in order to maintain the necessary viscosity of being pourable from a bottle with a small opening in the form of droplets which break off easily. It may be in the form of a lotion that pours from a container in the form of droplets. This semi-viscous mass in the form of droplets is capable of flattening out on the tooth brush so that only two or three drops are sufficient to cover the entire tooth brush. This affords an economical use of said dentifrice. Its viscosity in the form of droplets is such that it does not run off the brush but remains on the tooth brush until the brush is inserted into the mouth for normal use. In addition, since the dentifrice is used in liquid drops, direct contact of said container or dispenser with the tooth brush is avoided, thereby permitting a more hygienic utilization of the same preparation by a multitude of persons at the same time.

The preparation and composition of the polysaccharide stabilizing and suspending agent utilized herein is described in U.S. Patent No. 3,067,038, as an xanthomonas hydrophilic colloid. It possesses the unexpected property of maintaining the solid particles of the abrasive suspended in the liquid vehicle over prolonged (two years room temperature so far), periods of time. Consequently the liquid dentifrice needs no shaking prior to use. Even under conditions of elevated temperature, the suspension retains its stability and exhibits substantially no increase in viscosity.

The liquid dentifrice compositions of the present invention are stable, homogenous, pourable aqueous suspensions which contain conventional dentifrice ingredients such as humectants, detergents, anti-caries agents, flavoring materials, sweetening agents, coloring materials, abrasives, etc. stabilized by a high molecular weight polysaccharide containing mannose, glucose, potassium glucuronate and acetyl in the molecule in the molar ratio of 2:1:1:1. Water is the major ingredient, and constitutes about 50–85% by weight of the total composition. Minor amounts of inert solvents such as glycerine, alcohol, etc. about 10–30% by weight, may be added to the aqueous solution as desired to assist in cosmetic qualities and to plasticize the composition.

A sufficient amount of abrasive is needed to effectively cleanse, scour, polish the teeth, without scratching or otherwise adversely affecting them. About 10–20% by weight has been found to be the optimum amount of abrasive capable of being stably suspended in a liquid dentifrice and effectively cleanse the teeth. Suitable abrasives include hydrated alumina, dicalcium phosphate dihydrate, calcium pyrophosphate, insoluble sodium meta phosphate, anhydrous dicalcium phosphate, calcium carbonate, magnesium carbonate, magnesium oxide, finely powdered silica, mixtures thereof, and the like.

Minor amounts of a detergent may be added to the abrasive containing dentifrice in order to enhance the cleansing properties of the dentifrice. Suitable detergents that may be used are the aliphatic sulfated or sulfonated detergents. Examples of the aliphatic detergents are the sulfuric acid esters of polyhydric alcohols incompletely esterified with higher fatty acids, either saturated or unsaturated, particularly those whose acyl groups contain from 12 to 18 carbon atoms, e.g., coconut oil monoglyceride monosulfate, tallow diglyceride monosulfate, lauroyl monoglyceride monosulfate; the long chain pure or mixed higher alkyl sulfate, e.g., lauryl sulfate, cetyl sulfate, higher fatty alcohol sulfates derived from hydrogenated or non-hydrogenated coconut oil or tallow fatty acids; the higher fatty acid esters of hydroxy alkyl sulfonic acids; higher fatty acid amides of amino alkyl sulfonic acids, e.g., the oleic acid amide of amino methyl sulfonic acid, the lauric acid amide of taurine, and the like.

Other appropriate aliphatic sul(on)ates include fatty sulfoacetates, e.g., coconut fatty alcohol sulfoacetates; sulfated fatty acyl monoethanolamides, e.g., sulfated lauroyl monoethanolamide; fatty sulfoacetamides, e.g., lauryl sulfoacetamide; lower alkyl sulfosuccinates, e.g., dioctyl sulfosuccinate, and lower alkyl esters of alphasulfonated higher fatty acids, e.g., methyl ester of alphasulfo myristic acid, sodium salt.

Synthetic detergents having a carboxylate group, and particularly the higher fatty acid amides of aliphatic amino acid compounds may also be included. A feature is the higher fatty acyl sarcosinate having about 10 to 18 carbons, usually 12–14 carbons, in the acyl radical, preferably the water-soluble salts of N-lauroyl or N-cocoyl sarcosine. Other materials are the higher fatty acid amides of polypeptide amino acids obtained by protein hydrolysis. Suitable ether-containing sulfates may be used also such as the alkylphenol polyglycol ether sulfates, e.g., lauryl phenol polyethylenoxy sulfates; and alkyl polyglycol ether sulfates, e.g., lauryl ethyleneoxy sulfates, each containing about 10–18 carbons in said alkyl groups and averaging about 2 to 10 moles of ethylene oxide, usually 3–4 moles, per molecule.

These various anionic detergents are used in the form of their water soluble or water dispersible salts such as the amine, alkali metal and alkaline earth metal salts. Examples are the sodium, potassium, magnesium salts and the like. It is generally preferred to use the ammonium and amine (including alkylolamine) salts where greater solubility in aqueous media is desired such as the ammonium, monoethanolamine, diethanolamine, triethanolamine salts and mixtures thereof.

Other anionic detergents which may be employed also include water-soluble alkyl phosphates and soaps such as the sodium, potassium and triethanolamine soaps of fatty acids containing 12 to 18 carbons as well as mixtures of such soaps. Examples are sodium laurate, sodium palmitate, sodium oleate and the potassium and/or triethanolamine soaps of coconut oil, palm oil and tallow fatty acids.

Flavoring materials are added to the liquid dentifrice to render it commercially attractive to the consumer and to mask any objectionable taste resulting from the abrasive, or any other ingredient. Suitable flavors include oil of birch, oil of peppermint, oil of spearmint, wintergreen, vanillin, oil of cinnamon, clove, anise, fennel lavender, eucalyptus, thymol, menthol, camphor, and the like.

Sweeteners such as saccharin, sugar, honey, etc. may also be added to the liquid dentifrice to improve the taste.

The term "pourable" as used herein refers to the ability of the product to flow as a liquid from a container in the form of droplets which break off easily. The liquid product may be of variable viscosity. It may be highly fluid and free-flowing, or fairly viscous but pourable from the container in the form of droplets which break off easily. The liquid may be packaged in any suitable container, such as metal, glass or plastic in the form of bottles, cans, drums, packets or bags. When the product is fairly viscous, it may be preferable to package the composition in a squeeze bottle to facilitate dispensing of said dentifrice. The term "homogenous" as used herein means that the product has a satisfactory degree of stability during storage life against separation or formation of a plurality of distinct layers.

The liquid dentifrice is prepared in any suitable manner. Either the "cold" or "hot process" may be utilized. The cold or hot process comprise essentially the addition of the polysaccharide and the sweetener to the glycerine or alcohol (if any), adding the water, mixing, and heating to approximately 140–160° F. when using "hot" process. Adding the detergent and lastly the abrasive to the hot or cold composition and cooling if hot prior to the addition of the flavor. These formulations require several days standing to eliminate the air incorporated during their preparation. In order to avoid this standing period, it has been found that only 25% formula water is initially used, withholding approximately 40–42% formula water until the batch is completed, thereby eliminating the incorporation of air due to the initial thicker consistency of the formula, followed by the final addition of the balance of water and flavor. Only minimum stirring time is necessary to mix the final water and flavor, with no incorporation of air.

The following specific examples are further illustrative of the nature of the present invention, and it is to be understood that the invention is not limited thereto.

EXAMPLE I

| Ingredients | Percent |
|---|---|
| Glycerine | 20.0 |
| Polysaccharide of high molecular weight, the molecule containing mannose, glucose, potassium glucuronate and acetyl in the approximate molar ratio of 2:1:1:1 | 0.8 |
| Sodium benzoate | 0.5 |
| Saccharine sodium | 0.5 |
| Water | 61.7 |
| Sodium lauryl sulfate | 3.0 |
| Insoluble sodium metal phosphate | 10.0 |
| Anhydrous dicalcium phosphate | 1.0 |
| Flavor | 2.5 |
| | 100.0 |

The polysaccharide, sodium benzoate and saccharine are premixed and slowly added to the glycerine while stirring. The water is then added thereto and the mixture is heated to 150° F. and thoroughly mixed, whereby the mixture thickens. Sodium lauryl sulfate is added to the mixture with agitation. The phosphates are added thereto and the suspension is cooled, after which the flavor is included.

The resultant homogenous suspension was subjected to accelerated aging tests and exhibited no separation after 12 weeks at 110° F. This is equivalent to about three years aging at ordinary conditions. This formulation constitutes a stable liquid dentifrice having superior cleansing properties.

EXAMPLE II

The same ingredients as in Example I, except that the polysaccharide is increased to 0.9% and the water is decreased to 61.6%, are mixed in accordance with the procedure of Example I. The resultant composition is a stable, homogenous suspension capable of being poured from a container in the form of droplets.

EXAMPLE III

| Ingredients: | Percent by weight |
|---|---|
| Distilled water | 72.0 |
| Polysaccharide of high molecular weight, the molecule containing mannose, glucose, potasium glucuronate and acetyl in the approximate molar ratio of 2:1:1:1 | 1.0 |
| Sodium saccharine | 0.5 |
| Sodium lauryl sulfate | 3.0 |
| Insoluble sodium meta phosphate | 10.0 |
| Anhydrous dicalcium phosphate | 1.0 |
| Ethyl alcohol | 10.0 |
| Flavor | 2.5 |

The polysaccharide and the saccharine are premixed and dissolved in the water by stirring. The sodium lauryl sulfate is admixed therewith and the mixture again stirred. The phosphates, alcohol and flavor are now added thereto and the entire mixture stirred, whereby a homogenous, stable suspension is formed, particularly useful as a liquid dentifrice.

EXAMPLE IV

| Ingredients: | Percent by weight |
|---|---|
| Distilled water | 82.5 |
| Sodium benzoate | 0.5 |
| Sodium saccharine | 0.5 |
| Sodium lauryl sulfate | 3.0 |
| Hydrated alumina | 10.0 |
| Polysaccharide of high molecular weight, the molecule containing mannose, glucose, potassium glucuronate and acetyl in the approximate molar ratio of 2:1:1:1 | 1.0 |
| Flavor | 2.5 |

As in the procedure of Example III the "cold process" is utilized. The resultant composition is a homogenous, stable liquid dentifrice.

| | Percent by weight | |
|---|---|---|
| Ingredients | Example V | Example VI |
| Glycerine | 30.0 | 20.0 |
| Polysaccharide of high molecular weight, the molecule containing mannose, glucose potassium glucuronate and acetyl in the approximate molar ratio of 2:1:1:1 | 0.8 | 0.9 |
| Sodium benzoate | 0.5 | 0.5 |
| Sodium saccharine | 0.5 | 0.5 |
| Distilled water | 52.7 | 62.6 |
| Sodium lauryl sulfate | 3.0 | 3.0 |
| Hydrated alumina | 10.0 | 10.0 |
| Flavor | 2.5 | 2.5 |

The "cold process" as defined in Example III is used to formulate the above dentifrice, yielding a stable, homogenous suspension capable of being poured in the form of droplets that break off easily.

EXAMPLE VII

| Ingredients: | Percent by weight |
|---|---|
| Glycerine | 30.0 |
| Polysaccharide of high molecular weight, the molecule containing mannose, glucose, potassium glucuronate and acetyl in the approximate molar ratio of 2:1:1:1 | 0.8 |
| Sodium benzoate | 0.5 |
| Sodium saccharine | 0.5 |
| Distilled water | 39.8 |
| Sodium lauryl sulfate | 3.0 |
| Insoluble sodium meta phosphate | 10.0 |
| Anhydrous dicalcium phosphate | 1.0 |
| Distilled water | 11.5 |
| $SnF_2$ | 0.4 |
| Flavor | 2.5 |

The formulation utilizing the technique of the partial initial addition of the water resulted in a stable, homogenous therapeutic liquid dentifrice.

|  | Percent by weight ||
|---|---|---|
|  | Example VIII | Example IX |
| Water | 73.0 | 73.1 |
| Polysaccharide of high molecular weight, containing mannose, glucose, potassium glucuronate and acetyl in the approximate molar ratio of 2:1:1:1 | 1.0 | 0.9 |
| Saccharine sodium | 0.5 | 0.5 |
| Sodium lauryl sulfate | 3.0 | 3.0 |
| Hydrated alumina | 10.0 | 10.0 |
| Ethyl alcohol | 10.0 | 10.0 |
| Flavor | 2.5 | 2.5 |
|  | 100.0 | 100.0 |

The above formulations prepared in accordance with "cold process" of Example III yield stable, homogenous liquid dentifrice.

EXAMPLE X

Calcium carbonate is substituted for the hydrated alumina of Example IX. The resultant product is a stable liquid dentifrice.

EXAMPLE XI

A stable, homogenous therapeutic liquid dentifrice is prepared from the formulation of Example VI by adding 0.76% $Na_2PO_3F$ and reducing the water content accordingly.

EXAMPLE XII

A stable, homogenous therapeutic liquid dentifrice is prepared from the formulation of Example I by adding 0.76% $Na_2PO_3F$ and reducing the water content accordingly.

EXAMPLE XIII

The formulation of Example I was prepared in accordance with the "hot process" of Example I except that an elevated temperature of 160° F. was used. The stability of the end product is not adversely affected by the use of the increased temperature during its manufacture.

EXAMPLE XIV

The therapeutic liquid dentifrice of Example XII is prepared in accordance with the procedure of Example I, except that only a portion of the formula water, about 25% is added to the glycerine dispersion of the polysaccharide, the remaining amount of formula water being added as a final step. This eliminates incorporation of air into the initial thicker consistency of the formula. The resultant liquid dentifrice exhibits the time stability as formulations utilizing the complete addition of the water as an initial step.

Although the present invention has been described with reference to particular embodiments and examples, it will be apparent to those skilled in the art that variations and modifications of this invention can be made and that equivalents can be substituted, therefor, without departing from the principles and true spirit of the invention.

I claim:

1. A liquid dentifrice comprising a stable solution of about 10–20% by weight of an abrasive material in a liquid vehicle including water in amount of about 50–85% by weight of the dentifrice and about 0.3–2.0% by weight of a polysaccharide having a molecular weight in excess of 1,000,000, the molecule of which polysaccharide contains mannose, glucose, potassium glucuronate, and acetyl in the approximate molar ratio of 2:1:1:1.

2. A dentifrice in accordance with claim 1 which also contains up to about 30% glycerine.

3. A dentifrice in accordance with claim 1 which also contains up to about 10% ethyl alcohol.

4. A dentifrice in accordance with claim 1 wherein the abrasive is hydrated alumina.

5. A dentifrice in accordance with claim 1 wherein the abrasive is a mixture of insoluble sodium metaphosphate and anhydrous dicalcium phosphate.

6. A dentifrice in accordance with claim 1 wherein said polysaccharide is present in amount of about 0.8–1.0% by weight.

7. A dentifrice in accordance with claim 1 which also contains minor amounts of an anionic detergent.

8. A dentifrice in accordance with claim 7 which also contains an agent selected from the group consisting of $SnF_2$ and $Na_2PO_3F$.

No references cited.

RICHARD L. HUFF, Primary Examiner